C. A. KIGGINS.
HARROW.
APPLICATION FILED MAR. 29, 1915.
1,202,394.
Patented Oct. 24, 1916.
2 SHEETS—SHEET 2.
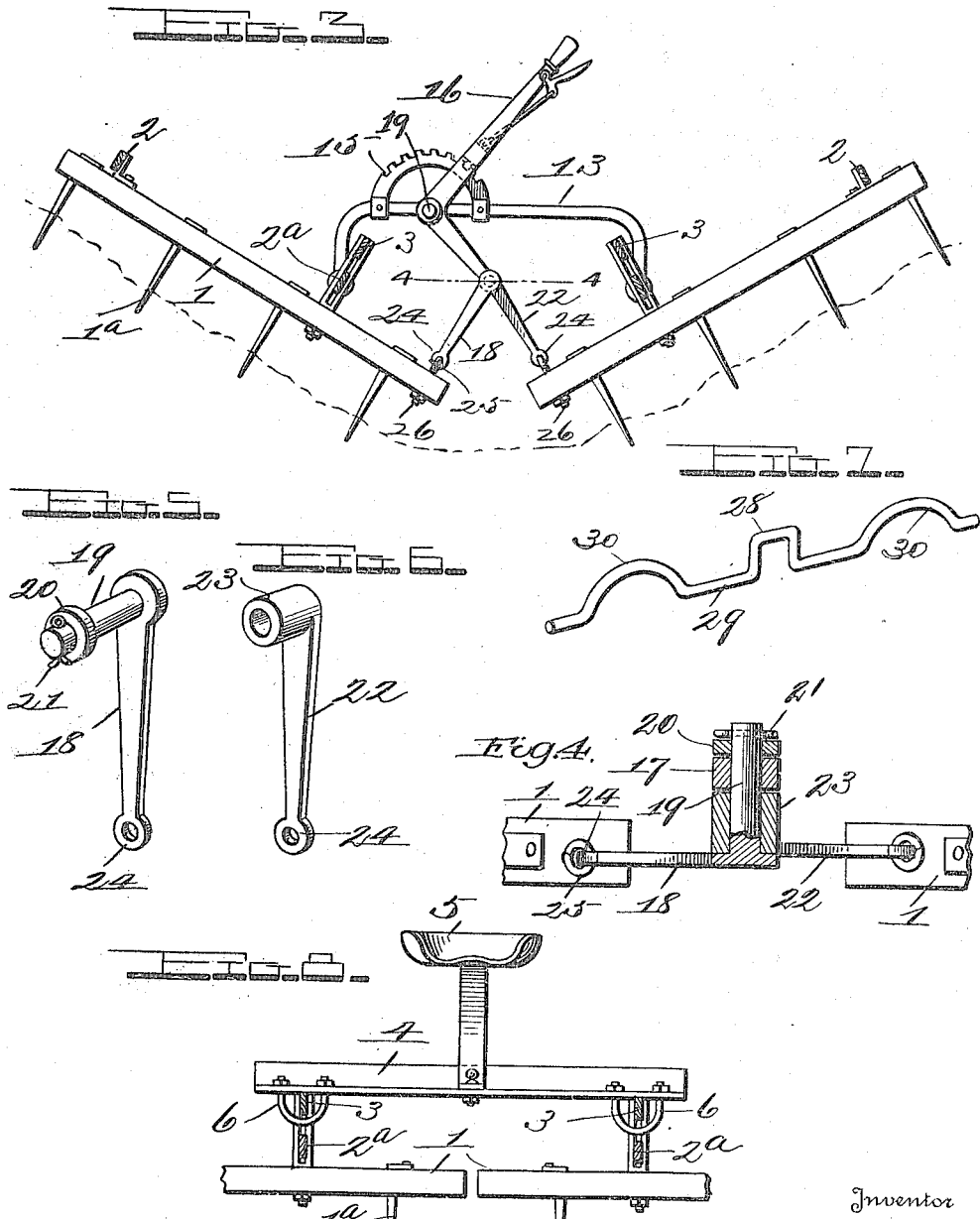
Witnesses
Chas. L. Griesbauer.
E. B. McBath
Inventor
C. A. Kiggins,
By Chas. E. Nock
Attorney

UNITED STATES PATENT OFFICE.

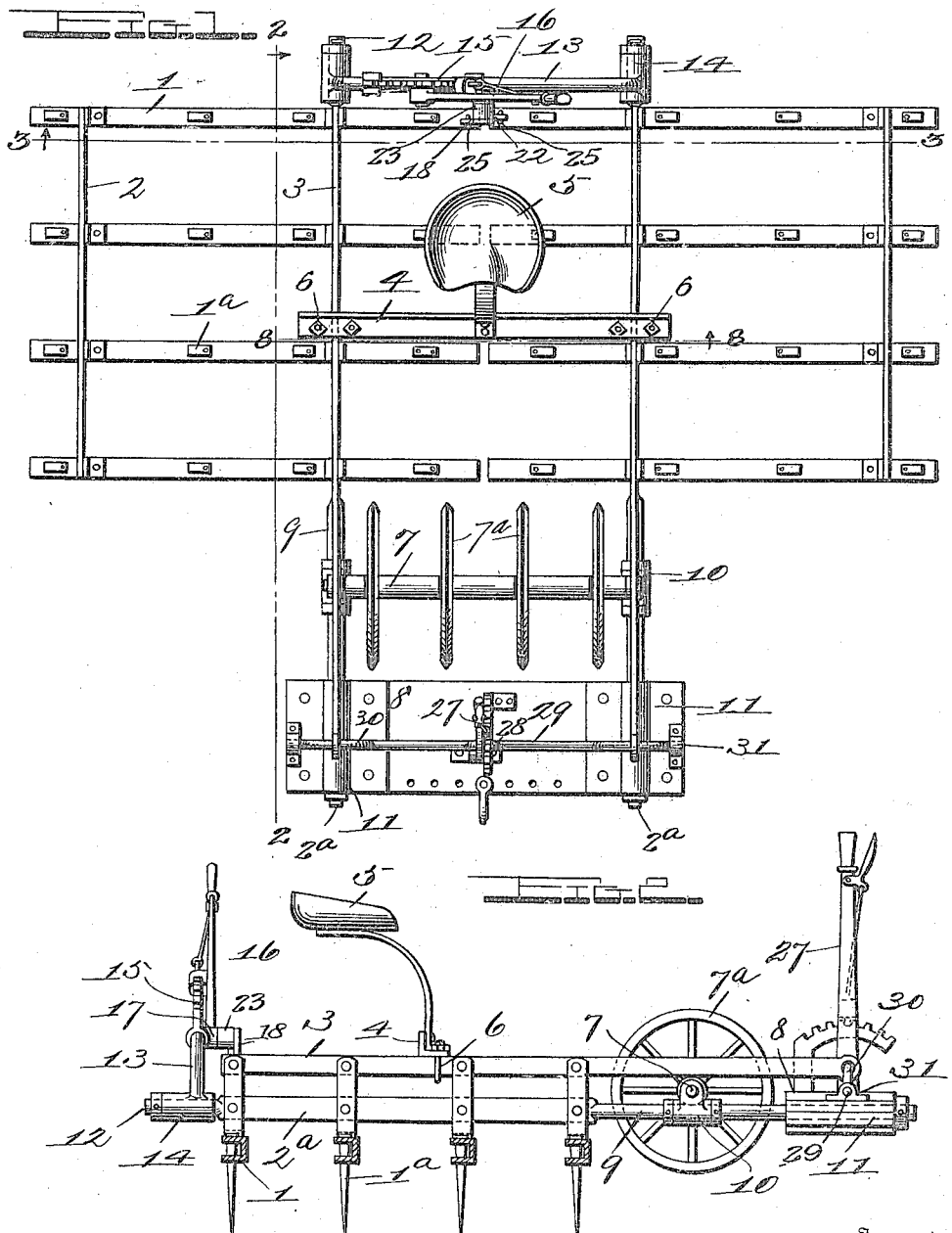

CHARLES A. KIGGINS, OF RULETON, KANSAS.

HARROW.

1,202,394.	Specification of Letters Patent.	Patented Oct. 24, 1916.

Application filed March 29, 1915. Serial No. 17,924.

*To all whom it may concern:*

Be it known that I, CHARLES A. KIGGINS, a citizen of the United States, residing at Ruleton, in the county of Sherman and State of Kansas, have invented a new and useful Improvement in Harrows, of which the following is a specification.

This invention is an improvement upon the harrow for which I was granted Letters Patent No. 1,113,219, October 13, 1914.

The improvement relates especially to the means for tilting and holding in tilted position the harrow sections, and also includes other features found desirable to employ in connection with the harrow shown and described in the patent referred to, especially when the device is used on listed ground.

The invention consists in the novel features of construction hereinafter described, pointed out in the claims, and shown in the accompanying drawings, in which:

Figure 1 is a plan view. Fig. 2 is a section on the line 2—2 of Fig. 1. Fig. 3 is a section on the line 3—3 of Fig. 1, showing the position of the harrow sections with respect to each other when operating on ridges or listed ground. Fig. 4 is a sectional detail view showing the manner of connecting certain links to an operating lever. Figs. 5 and 6 are detail perspective views of the links. Fig. 7 is a perspective view of a tooth bar operating rod. Fig. 8 is a section on the line 8 of Fig. 1.

In these drawings, which illustrate two sections of a harrow 1 are the longitudinal bars at right angles to the draft, and 2 the transverse connecting bars, and 2ª similar connecting bars adjacent the inner ends of the sections and which extend beyond the front and rear sides of the harrow sections.

3 are the rocking bars which preferably are arranged immediately above the bars 2ª. The bars 3 support a seat bar 4 upon which is mounted a seat 5, held to the bar 4 by U-clips 6. At the forward end a shaft 7 has pulverizer wheels 7ª, and in advance of the shaft is a platform 8, the shaft 7 and platform connecting the two sections of the harrow, which are otherwise independent of each other.

It will be noted that the bars 2ª are rounded in advance of the harrow sections passing through journal bearings 10 and 11 carried respectively by the shaft or axle 7 and the platform 8, thus allowing for tilting or rocking movement of the two sections.

At the rear I extend the bars 2ª in the form of cylindrical bearings 12 for an arch 13 which arch or connecting yoke is provided with sleeves 14 which fit over the rearwardly extending portions 12. It will be of course understood that these portions 12 rotate in the sleeves 14, the latter remaining stationary. The yoke 13 carries a rack segment 15 and a pivoted and angled lever 16 is carried by the yoke and works on the rack segment. The lower end of this lever has a sleeve 17 which forms a bearing for a shaft 19 carrying a link 18. The shaft 19 turns in the sleeve 17 being held in place by a washer 20 and cotter pin 21. The link 22 has a sleeve 23 which fits over the shaft 19 and rests between the link 18 and the sleeve 17 of the lever 16. These links therefore turn on the same center, but each works independently of the other and in unison with the lever 16. These links are provided at their lower ends with eyes 24 which engage eyes 25 of bolts 26, which in turn pass through the inner end portions of the rearmost bars 1.

As shown in my previous patent and as illustrated in Fig. 2 the bars 1 are pivotally suspended from the bars 2 and 2ª and have teeth 1ª. To rock these bars and shift the angle of the teeth there is provided a lever 27 mounted on the platform 8 and engaging the cranked portion 28 of a rod 29, and the rocking bars 3 engage bow portions 30 of the rod 29, the ends of the rod being journaled in bearings 31 mounted on the platform 8.

The lever 16 carries the usual hand grip and by means of said lever with the rack 15 and the links 18 and 22 the harrow sections can be tilted at an angle to each other, and held in tilted position, as shown in Fig. 3, and this adjustment does not interfere with the adjustment of the angle of the teeth 1ª which can be set vertical, or inclined forward or rearward as may be desired.

What I claim is:

1. A harrow comprising two sections, each section having a forwardly and rearwardly extending bar, connecting means at front and rear of said sections, the bars being rotatably mounted in said connection means, a lever mounted on one connecting means, and links carried by said lever, said links being loosely connected to said sections, respectively.

2. A harrow comprising two sections, each section having rearwardly and laterally extending bars, means for rotatably supporting two adjacent rearwardly extending bars of the sections in advance of said sections, a yoke having sleeves rotatably fitting over the rear ends of the last mentioned bars, a rack segment carried by said yoke, a lever carried by the yoke, and links carried by the lever and turning on the same center, said links being loosely connected to the adjacent ends, respectively of the rearmost laterally extending bars.

CHARLES A. KIGGINS.

Witnesses:
   JOHN F. HESTON,
   ROY HESTON.

Copies of this patent may be obtained for five cents each, by addressing the "Commissioner of Patents, Washington, D. C."